US012066039B2

(12) United States Patent
Hikind et al.

(10) Patent No.: US 12,066,039 B2
(45) Date of Patent: Aug. 20, 2024

(54) PNEUMATIC ACTUATOR

(71) Applicant: RAFAEL ADVANCED DEFENSE SYSTEMS LTD., Haifa (IL)

(72) Inventors: Yuval Hikind, Kiriat Ata (IL); Rei Shragai, Kibbutz Hazorea (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 0 days.

(21) Appl. No.: 17/912,881

(22) PCT Filed: Apr. 26, 2021

(86) PCT No.: PCT/IB2021/053409
§ 371 (c)(1),
(2) Date: Sep. 20, 2022

(87) PCT Pub. No.: WO2021/220129
PCT Pub. Date: Nov. 4, 2021

(65) Prior Publication Data

US 2023/0078880 A1 Mar. 16, 2023

(30) Foreign Application Priority Data

Apr. 26, 2020 (IL) ........................................ 274262

(51) Int. Cl.
*F15B 15/16* (2006.01)
*F15B 1/26* (2006.01)
*F15B 21/00* (2006.01)

(52) U.S. Cl.
CPC ................ *F15B 15/16* (2013.01); *F15B 1/26* (2013.01); *F15B 21/008* (2013.01)

(58) Field of Classification Search
CPC .. F15B 1/021; F15B 1/26; F15B 15/16; F15B 21/008
See application file for complete search history.

(56) References Cited

U.S. PATENT DOCUMENTS 3,831,901 A 8/1974 Williams et al.
4,075,929 A 2/1978 Peterson
(Continued)

FOREIGN PATENT DOCUMENTS

EP 0940584 A2 9/1999
GB 2078912 A 1/1982

OTHER PUBLICATIONS

International Search Report for PCT/IB2021/053409 Mailed on Jul. 15, 2021.

(Continued)

*Primary Examiner* — Abiy Teka
(74) *Attorney, Agent, or Firm* — Rivka Friedman

(57) ABSTRACT

A pneumatic actuator for imparting velocity to a resting object, comprising a fixed member and a ram, the ram having two or more generally elongated ram members, wherein the fixed member is formed with a base plate having an inlet hole therethrough, the ram members are formed and disposed concentrically about the center axis so as to lie one within another and to move in a telescopic arrangement, the innermost one of the ram members is configured to enable it to be driven by any pressurized gas fed through the inlet hole and to drive the object, and each of the other ram members is configured to move only behind the innermost ram member;

the actuator being operative to move the innermost ram member along its entire range of motion and thereby impart velocity to the object.

14 Claims, 7 Drawing Sheets

(56) References Cited

U.S. PATENT DOCUMENTS

| | | | | |
|---|---|---|---|---|
| 5,341,724 | A * | 8/1994 | Vatel | F15B 15/16 91/1 |
| 5,390,586 | A * | 2/1995 | Jones | F15B 21/044 92/52 |
| 5,613,418 | A * | 3/1997 | Guido | F15B 15/16 92/52 |
| 6,073,886 | A | 6/2000 | Jakubowski, Jr. et al. | |
| 2002/0096043 | A1 * | 7/2002 | Dawson | F15B 15/16 92/52 |
| 2003/0033926 | A1 | 2/2003 | MacLeod et al. | |

OTHER PUBLICATIONS

Extended European Search Report FPR EP 21796710.8 Mailed on Sep. 25, 2023.

* cited by examiner

Prior art

PNEUMATIC ACTUATOR

The invention is directed to high-speed linear actuators and, in particular, to pneumatic actuators for missile launchers.

BACKGROUND

Launching a missile, i.e. ejecting it from a canister of a launcher, by igniting a rocket engine inside the canister is problematic, since the inside surfaces of the canister need to be specially treated in order to withstand the effects of the exhaust fire and fumes. This leads to the requirement of ejecting the rocket from the launcher by an external driving force, before igniting its engine. Under some circumstances there may be also safety considerations that require imparting the missile an initial velocity to reach some minimal required height, at a safe distance from the launcher, before igniting its engine. One approach for creating such force is the use of a pyrotechnic gas generator, but this, as well, requires appropriate protection for the canister and presents a hazard of explosion and incineration of its surroundings.

SUMMARY OF THE INVENTION

By way of introduction, a generally preferred means for ejecting a missile so as to reach a safe distance from the launcher before ignition of an onboard rocket engine, without using a pyrotechnic gas generator, is a pneumatic actuator, where pressurized gas is held in a storage vessel and, when required, is led into an enclosure so as to push a ram, which, in turn, drives the missile during a stroke of a certain length. Such a pneumatic actuator may be useful also for other situations in which it is required to quickly impart velocity to a resting object. An actuator according to the present invention is applicable to such situations as well, but, for the sake of clarity and conciseness, it will be described herein in terms of embodiments applicable to launching a missile; its application to driving any other object would be readily understood by persons ordinarily knowledgeable in the art.

The task is to impart to the missile a sufficient amount of energy to reach an effective height before ignition of the rocket engine, by efficiently using the energy of the pressurized gas, which has a given volume of storage and a given storage pressure, within the limitations of a given maximal height of the actuator and a given maximal acceleration that the missile is allowed to undergo. In some situations, namely when the volume of gas storage is relatively small, the pressure of the gas may drop as it flows into the expanding volume of the enclosure as the ram moves, reducing the force acting on the ram and thus also on the missile. Since the total energy imparted to the rocket is proportional to the integral of the force over the stroke, the diminishing force will result in reduced energy (and hence lower reachable height).

In an actuator according to the present invention, the ram includes a plurality of members, to be termed ram members, arranged telescopically one within another, i.e., they are configured so that, while the missile is being driven, they emerge one from another so that each ram member is mechanically supported by the next ram member surrounding it and so that at the end of the driving stroke their individual lengths contribute to the overall length of the ram. As a result, the length of the stroke is much greater than the height of the actuator when inactive, thus allowing more energy to be imparted to the missile for a given gas pressure or a given maximum allowable acceleration.

An actuator with multiple ram members according to the present invention may take on a variety of configurations and embodiments, all having the following characteristics:

(a) The actuator is configured so that the gas drives (i.e., exerts force on) the innermost ram member throughout its motion (i.e., throughout the stroke), the innermost ram member being the one that drives the missile.

(b) The other ram members are configured to move only behind the innermost ram member.

In one group of configurations or embodiments (an example of which is described below), the force exerted by the gas on the innermost ram member is the only force that contributes to driving the missile. This advantageously enables adjusting the force (which is the product of the gas pressure and the effective cross-sectional area on which it acts) to a value that attains the maximum permitted acceleration.

In another group of configurations or embodiments (an example of which is described further below), the actuator is configured so that, over a part of the stroke, force exerted on any of the ram members other than the innermost one also contributes to driving the missile. This advantageously enables adjusting the driving force during the stroke in compensation for diminishing gas pressure, thus approximating an optimal situation where maximal energy is imparted to the rocket by having a force corresponding to the maximal permissible acceleration for the missile exerted on the rocket over the entire stroke.

More specifically, the present invention, in some embodiments, provides a pneumatic actuator for imparting velocity to a resting object, comprising a fixed member and a ram, the ram having two or more generally elongated ram members, each having a first end and a second end, wherein the fixed member is formed with a base plate and an outer cylinder, fixedly joined to the base plate concentrically about a center axis, the base plate having an inlet hole therethrough, wherein the ram members are formed and disposed concentrically about the center axis so as to lie one within another and within the outer cylinder, the first end of each ram member being disposed closer to the base plate than its second end, and to move parallel to the center axis in a telescopic arrangement, wherein the innermost one of the ram members is further formed and configured so as to enable its first end to be driven by any pressurized gas fed through the inlet hole and its second end to drive the object, and wherein each of the other ram members is further formed and configured so as to move only behind the innermost ram member;

the actuator being operative, upon the feeding of pressurized gas into the inlet hole, to move the innermost ram member along its entire range of motion and thereby impart velocity to the object.

In some embodiments, the actuator is configured and further operative to have the pressurized gas drive solely the first end of the innermost ram member until the first end is near the second end of the ram member immediately surrounding it.

In some embodiments, the fixed member further includes an inner cylinder, fixedly joined to the base plate concentrically about the center axis and configured to accommodate the innermost ram member, and wherein the inlet hole is in fluid communication solely with space inside the inner cylinder.

In some embodiments, the actuator is configured so that none of the other ram members exerts a force, directly or indirectly, on the innermost ram member in a direction away from the base plate at any time during operation.

The actuator may be further operative to have any of the ram member pull another ram member that is disposed next outside it.

The actuator may further comprise a shock absorbing system, in fluid communication with a space between the outer cylinder of the fixed member and the outermost one of the ram members, the shock absorbing system being operative to prevent the outermost ram member from moving faster than the ram member next within it.

In some other embodiments, at least two of the ram members include means for locking one of them to the other, or the actuator further comprises means for interlocking any one of the ram members with a second ram member next outside it. These means for locking may be operative to interlock the one ram member with the second ram member upon the one ram member having moved a predefined distance relative to the second ram member. These means for locking may include a pin near the first end of the one ram member and a groove near the second end of the second ram member, the groove formed to accommodate the pin.

In some of these embodiments, the actuator is configured so as to enable each of the other ram members to be driven by the pressurized gas while that ram member is interlocked with a ram member next within it. Preferably, the effective cross-sectional area of all the ram members that are interlocked and over which the gas exerts a pressure to effect the driving, at any time during operation, is inversely related to approximately the average gas pressure expected at that time.

There is also provided, according to the present invention, a system for imparting velocity to a resting object, comprising one or more actuators as disclosed hereabove, a reservoir, containing pressurized gas, and an activation valve corresponding to each of the actuators, wherein the reservoir is in fluid communication, through the activation valves, with the inlet holes in the corresponding actuators, the system being operative to allow the pressurized gas to be fed into any of the inlet holes when the corresponding activation valve is open.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 6A relates to an actuator of prior art, FIG. 6B relates to the actuator of FIG. 1 and FIG. 6C relates to the actuator of FIG. 3.

DETAILED DESCRIPTION OF THE INVENTION

Figure 1:
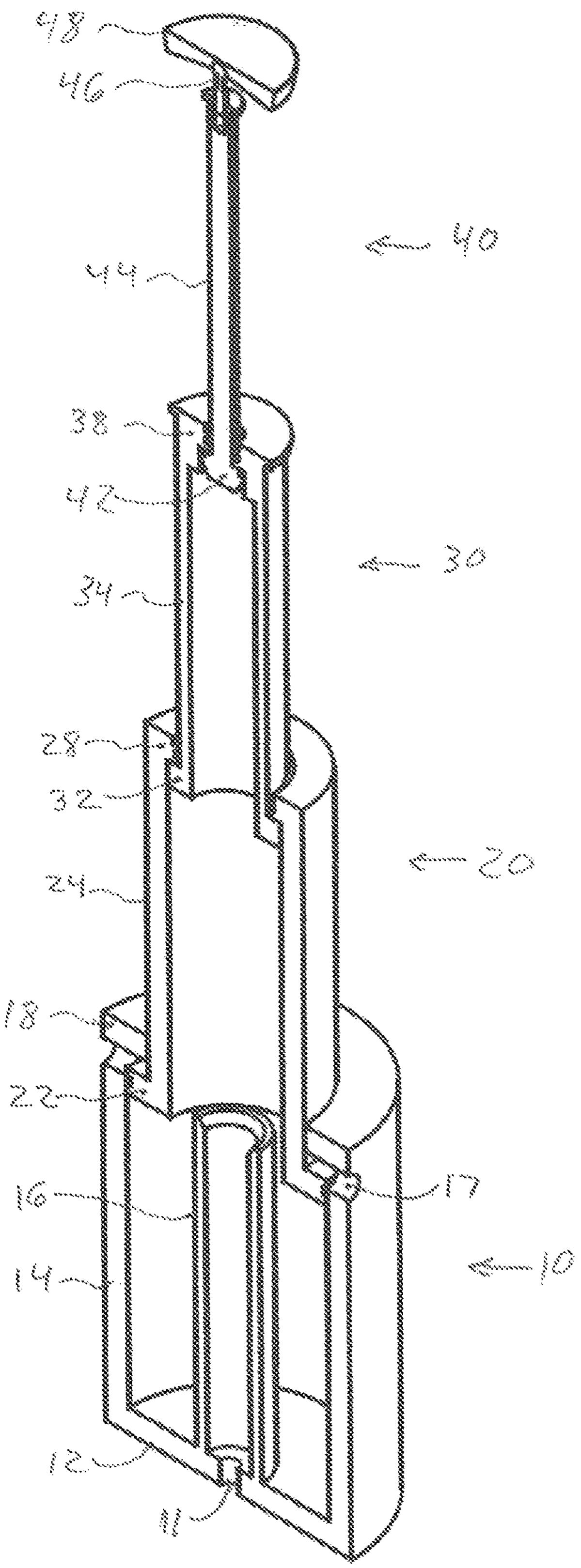
FIG. 1 is a cut trimetric view of an actuator, according to an example embodiment of the invention, in a fully extended state.
Figure 2:
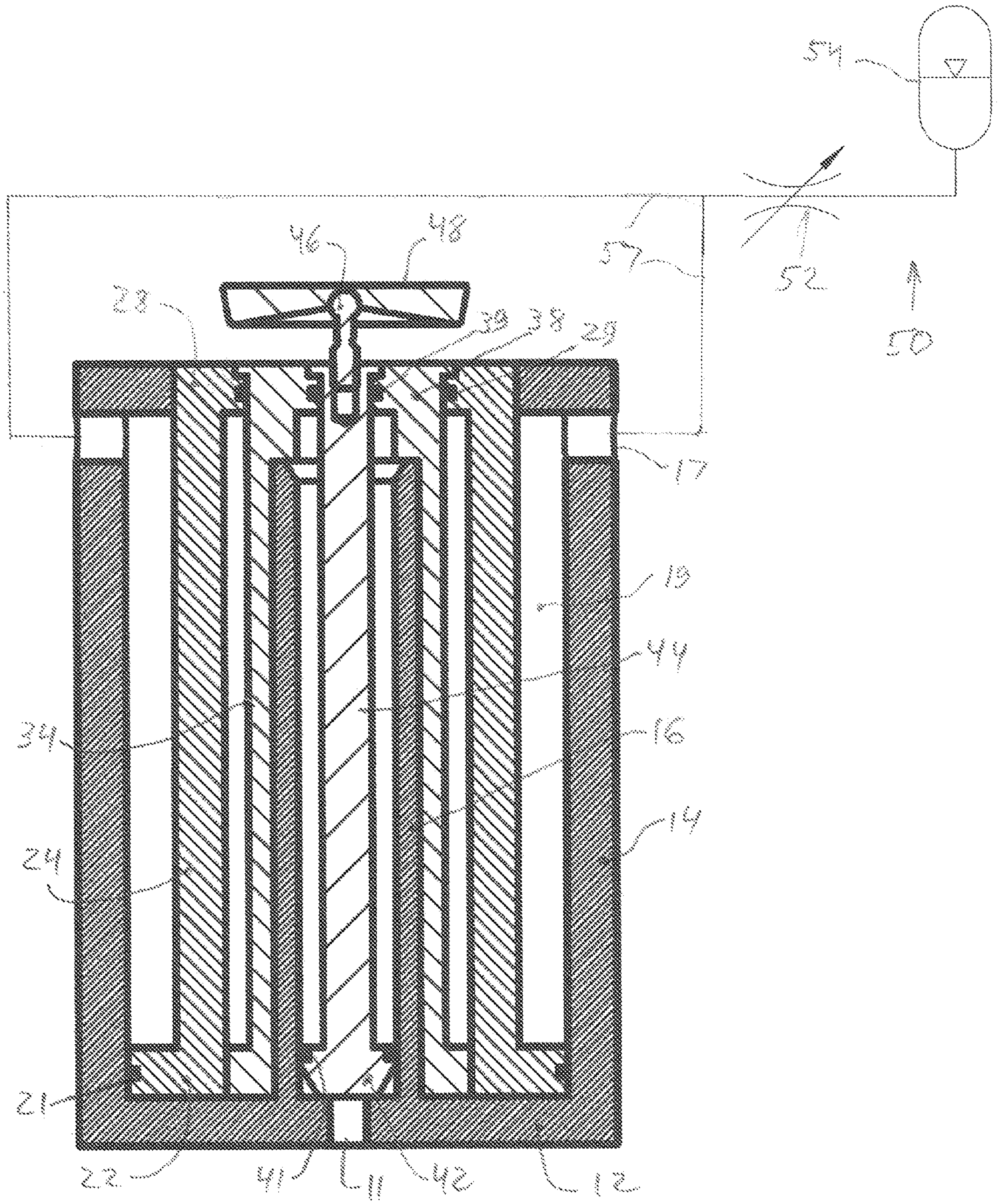
FIG. 2 is a vertical cross-sectional view of the actuator of FIG. 1, in an initial, collapsed state.

FIGS. 1 and 2 show an example embodiment of an actuator according to the invention, wherein FIG. 1 is a cut trimetric view of the actuator in a fully extended state, while FIG. 2 is a vertical cross-sectional view of the actuator in a collapsed state, which is the state in which it is normally held, ready to be activated. The actuator includes a fixed structure 10 and three generally elongated movable members, namely an outermost ram member (or outer ram member, for short) 20, a middle ram member 30 and an innermost ram member (or inner ram member, for short) 40, which together constitute a ram for upwards driving a rocket (not shown), or any other object, resting in contact with the inner ram member 40. The three ram members 20, 30 and 40 and the fixed structure 10 are arranged concentrically about a vertical center axis (i.e. an axis normal to the base plate) and formed so as to mutually fit in a telescoping arrangement, as described below; the length of each of these four components is typically about 800 mm.

The fixed structure 10 includes a base plate 12, an outer cylinder, with wall 14, fixedly joined with the base 12 and with a top ring 18, and an inner cylinder 16, also fixedly joined with the base 12, but being open at its top. At the center of the base 12 is a gas inlet hole (inlet hole, for short) 11, in fluid communication with the inside volume of the inner cylinder 16. The inner diameter of the top ring 18 is smaller than the inner diameter of the outer wall 14, which is typically 105 mm. The inner diameter of the inner cylinder 16 is typically 20 mm. Optionally there are one or more holes 17 through the wall 14 at its top, serving as conduits for a liquid that is part of a hydraulic shock absorbing system 50 (FIG. 2), to be described below.

The outer ram member 20 is formed as a cylinder, with a wall 24, the bottom of which is fixedly joined with a flange 22 and the top of which is fixedly joined with a top ring 28. The inner diameter of the wall 24 is typically 70 mm. The flange 22 has an outer diameter nearly equal to the inner diameter of the outer wall 14 and its outside rim is provided with a seal 21, configured to remain in contact with the wall 14 so as to prevent gas flow between them. The top ring 28 has an inner diameter smaller than that of the wall 24 and its inside rim is provided with a seal 29, configured to remain in contact with the wall 34 (see below) of the middle ram member 30 so as to prevent flow of gas, as well as of liquid, between them.

The middle ram member 30 is also formed as a cylinder, with a wall 34, the bottom of which is fixedly joined with a flange 32 and the top of which is fixedly joined with a top ring 38. The inner diameter of the wall 34 is greater than the outer diameter of the inner cylinder 16 (of the fixed structure 10) just enough to allow sliding between the two parts, yet resisting easy flow of gas between them. The flange 32 has an outer diameter nearly equal to the inner diameter of the wall 24 of outer ram member 20, such that it may fittingly slide along the inner surface of wall 24. The top ring 38 has an inner diameter slightly greater than the diameter of the rod 44 of the inner ram member 40 (see below) and its inside rim is provided with a seal 39, configured to remain in contact with rod 44 so as to prevent gas flow between them. Optionally, the upper part of wall 34, just below ring 38, is made thicker so that its inner surface 37 has a diameter about equal to the inner diameter of inner cylinder 16; it thus defines a recess that can accommodate flange 42 of inner ram member 40 (see below) when at its maximum relative height.

The inner ram member 40 is formed as a cylindrical rod 44, the bottom of which is fixedly joined with a flange 42. The flange 42 has an outer diameter nearly equal to the inner diameter of inner cylinder 16 and it is provided with a seal 41, configured to remain in contact with inner cylinder 16 so as to prevent gas flow between them. To the top of rod 44 is fixedly attached, from above, a ball joint 46, which mates with a contact plate 48, configured to make contact, during operation, with the bottom of a missile (or any other object to be driven) and to push it upwards.

The shock absorbing system 50 is illustrated schematically in FIG. 2. It is seen to include an accumulator 54, containing a liquid (e.g. oil), and, fluidly connected thereto, an adjustable constriction 52 and tubing 57, which, in turn is fluidly connected, through the holes 17 in the fixed outer cylinder wall 14, to the space 19 between that wall 14 and the wall 24 of the outer ram member 20. The accumulator 54 also contains compressed nitrogen, which exerts pressure on the liquid, and thus is configured to feed the liquid through the constriction 52, tubing 57 and holes 17 into the space 19; it is also configured to accommodate any liquid that flows into it, under external pressure, through these conduits. The function and operation of the shock absorbing system 50 is explained further below.

Prior to operation and as depicted in FIG. 2, the three ram members 20, 30, and 40 are at their lowest positions, generally one within the other and all within the fixed structure 10, with their respective flanges 22, 32 and 42 resting on the base 12. As can be seen, rod 44 and flange 42 of inner ram member 40, are within the inner cylinder 16, while wall 34 and flange 32 of ram member 30 are outside inner cylinder 16 but within wall 24 of ram member 20, which (together with flange 22) is, in turn, within wall 14 of the fixed structure 10.

To begin driving operation, pressurized gas is fed, by means of an activation valve (not shown) from a reservoir (not shown), into the inlet hole 11 (of the fixed structure 10). The gas exerts force on flange 42, pushing it upwards inside and along inner cylinder 16, in effect lifting the whole inner ram member 40, wherein rod 44 slides through the opening of top ring 38 of ram member 30. Seal 41 prevents the gas from escaping into the upper space of inner cylinder 16, thus not affecting any of the other ram members. This upward motion of ram member 40 will be referred to as a first-stage stroke.

At the end of the first stage of ram motion, as described above, the top surface of flange 42 butts against the bottom surface of top ring 38 of middle ram member 30, causing the inner ram member 40 to begin pulling the middle ram member 30. However, at that point also seal 41 has cleared out of inner cylinder 16 and the gas is now free to flow through the top opening of inner cylinder 16 into the inside space of middle ram member 30. While continuing to push ram member 40 upward, the gas then exerts upward pressure also on the top ring 38, causing the middle ram member 30 to lift. Since the middle ram member 30 does not carry a load (unlike the inner ram member 40, which remains in contact with the missile), it will generally have a greater acceleration than the inner ram member 40 and will thus rise faster until its flange 32 butts against the top ring 28 of the outer ram member 20 (all—while inner ram member 40 continues to rise).

This causes the middle ram member 30 to begin pulling the outer ram member 20. At that point the gas may also begin to exert upward pressure on the outer ram member 20, causing it to accelerate as well. However, as the outer ram member 20 rises, the space 19 between its wall 24 and the fixed outer cylinder wall 14 diminishes, owing to the rising flange 21, thus pushing the liquid that fills it back into the shock absorbing system 50. As the speed of this rise increases, the resistance of the constriction 52 increases. The constriction 52 is adjustable so that its resistance to flow becomes balanced against the force exerted by the gas on the outer ram member 20 and the middle ram member 30 (which members now move together), limiting their speed to be less than that of inner ram member 40, thus remaining behind it. Inner ram member 40 is thus left to continue to be accelerated only by the force exerted on it directly by the gas, without any additional force from the other ram members (which lag behind, as described above). This upward motion of ram member 40, occurring during a second stage of ram motion, will be referred to as a second-stage stroke.

Finally, when the top surface of flange 42 of inner ram member 40 butts again against the bottom surface of top ring 38 of middle ram member 30, the inner ram member 40 begins to decelerate, owing to the drag exerted by the shock absorbing system 50 through the other ram members, until a new equilibrium speed is attained. All the members then move together at this final speed until the flange 22 of the outer ram member butts against the top ring 12 of the fixed structure 10. At this point, which ends the third stage of ram motion, the entire ram motion stops, completing what will be referred to as a third-stage stroke, whereupon the missile breaks contact and continues rising at that final speed.

It will be appreciated that, unlike telescoping-ram pneumatic actuators of prior art, in which gas pressure is exerted on all the ram members from the beginning, causing maximal force and acceleration at the beginning and diminishing force thereafter, the actuator of the present invention limits the area to which gas pressure is applied, so as to effect acceleration of the missile, to that of the inner ram member and, moreover, keeps it effective over most of its travel. Thus, the only force that causes acceleration of the missile throughout the entire ram travel is the force applied directly (by the gas) on the inner ram member; none of the other ram members, even though acted on by the gas, exerts an (upward) force, directly or indirectly (i.e., through another ram member), on the inner ram member and thus they do not affect the acceleration of the missile. It will be further appreciated that, when the volume of pressurized gas is sufficient, the force applied to the missile by an actuator of the present invention is such that provides maximum allowable acceleration and nearly keeps that acceleration over most of its operation.

It is noted that, in the example embodiment, the gas exerts pressure during the first stage solely on the inner ram member 40, owing to the isolation provided by inner cylinder 16, which prevents the gas from reaching the other ram members. In other embodiments, the effect of the inner ram member being the only one that moves during the first stage may be achieved by providing other means or structural features. It is likewise noted that, while in the example embodiment the effect of the lagging of the other ram members during the second and third stages is achieved by means of the shock-absorbing system, in other embodiments other means or structural features may be deployed to achieve a similar effect.

An actuator as described above functions well, with the advantages over prior-art actuators as indicated above, as long as the volume of the reservoir supplying the pressurized gas is relatively large, so that expansion of gas into the spaces cleared by the rising ram members does not noticeably reduce its pressure. For launching systems in which such condition does not hold, i.e. where the gas reservoir has relatively small volume, so that the gas pressure may diminish during operation, another configuration of an actuator according to the invention is provided and explained in terms of example embodiments, described below with reference to FIGS. 3-5.

Figure 3:
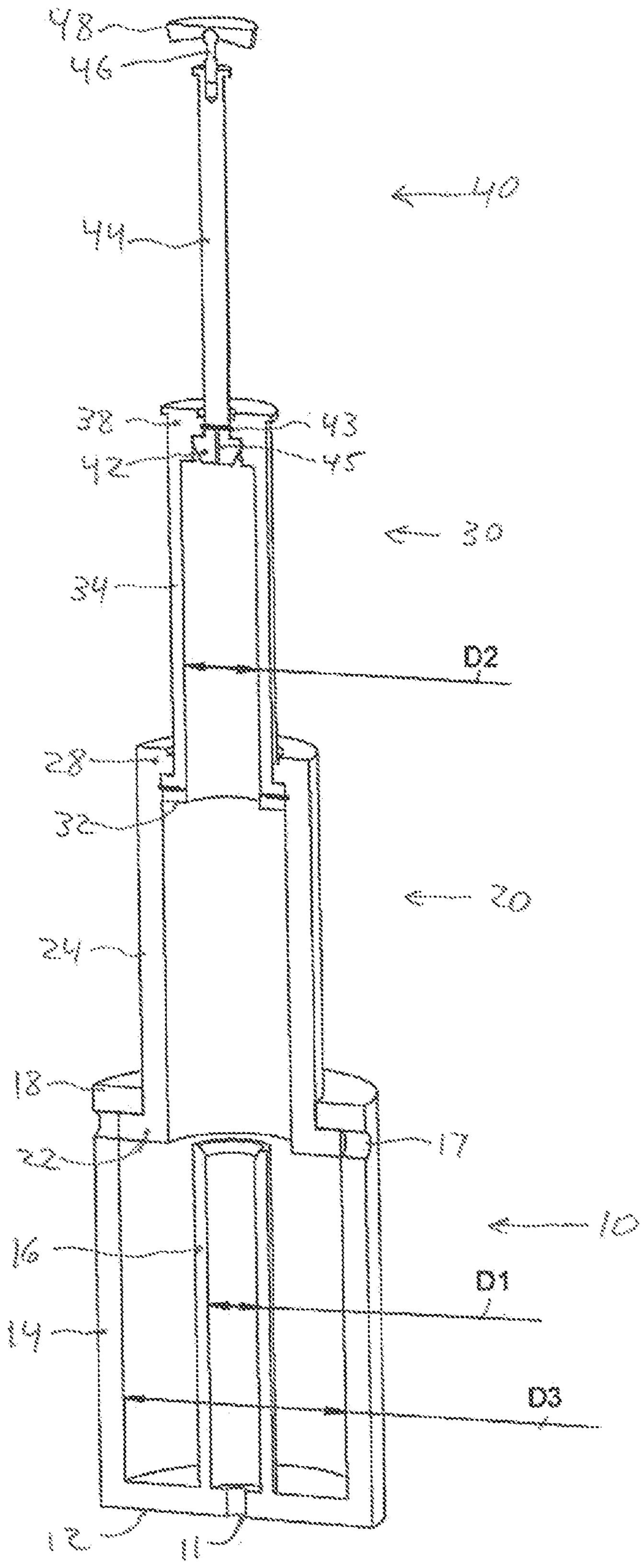
FIG. 3 is a cut trimetric view of an actuator, according to another example embodiment of the invention, in a fully extended state.
Figure 4:
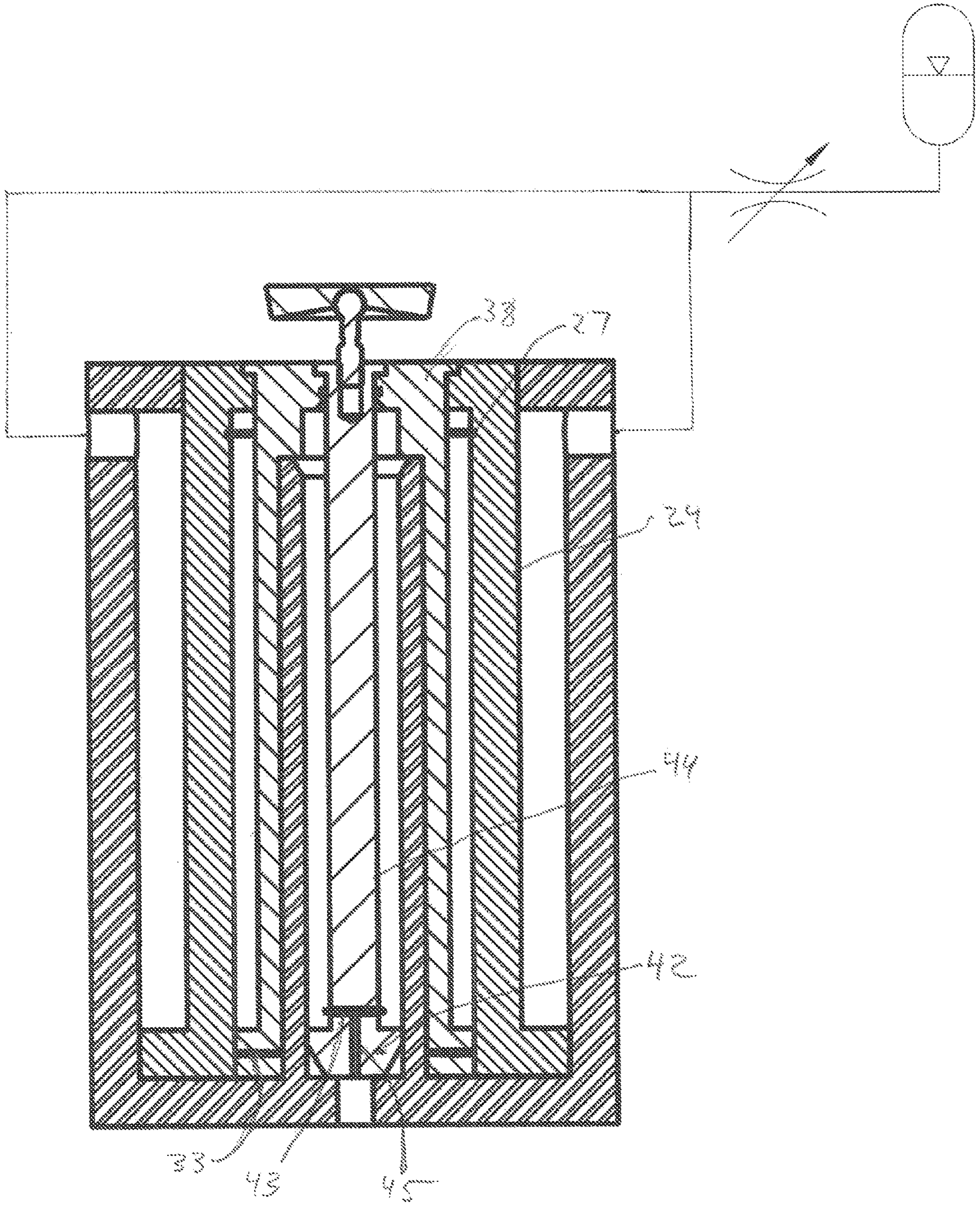
FIG. 4 is a vertical cross-sectional view of the actuator of FIG. 3, in an initial, collapsed state.

FIGS. 3, 4 and 5 show an example embodiment of an actuator according to a second configuration of the invention, wherein FIG. 3 is a cut trimetric view of the actuator in a fully extended state, FIG. 4 is a vertical cross-sectional view of the actuator in a collapsed state, which is the state in which it is normally held, ready to be activated, while FIG. 5 shows, in vertical cross-sectional view, the actuator in a series of states during operation; FIG. 5 also includes two detail drawings. This embodiment is similar to that shown in FIGS. 1 and 2 and discussed above, except for the following additional features, some of which are shown enlarged in the detail drawings. Features in FIGS. 3-5 that are common with features in FIGS. 1-2 are denoted by the same reference numbers.

Near the bottom of rod 44 of inner ram member 40, just above flange 42, there is a horizontal bore 43, centrally through the rod 44. Connected to the horizontal bore 43, at its middle, is a vertical bore 45, extending down through the bottom face of the flange 42. Within the horizontal bore 43 are disposed two pins 43*a* and, between them, a coiled spring 43*b* (see detail drawing in FIG. 5B), configured to hold the pins 43*a* protruding from the rod 44 (as can be seen in FIG. 4). In the inner rim of top ring 38 (of ram member 30), just below seal 39, is a circular groove 37, formed so as to accommodate pins 43*a*. Additionally, the inner rim of top ring 38 is beveled at its bottom.

Also, across the flange 32 of middle ram member 30 there are two horizontal bores 33. In each bore 33 are disposed a pin 33*a* and a coiled spring 33*b* (see detail drawing in FIG. 5D), configured to push the pin 33*a* outwards. Near the top of the wall 24 (of ram member 20) is a circular groove 27, formed on the inner face of the wall so as to accommodate pins 33*a*.

Figures 5A, 5B, 5C, 5D, 5E, 5F:
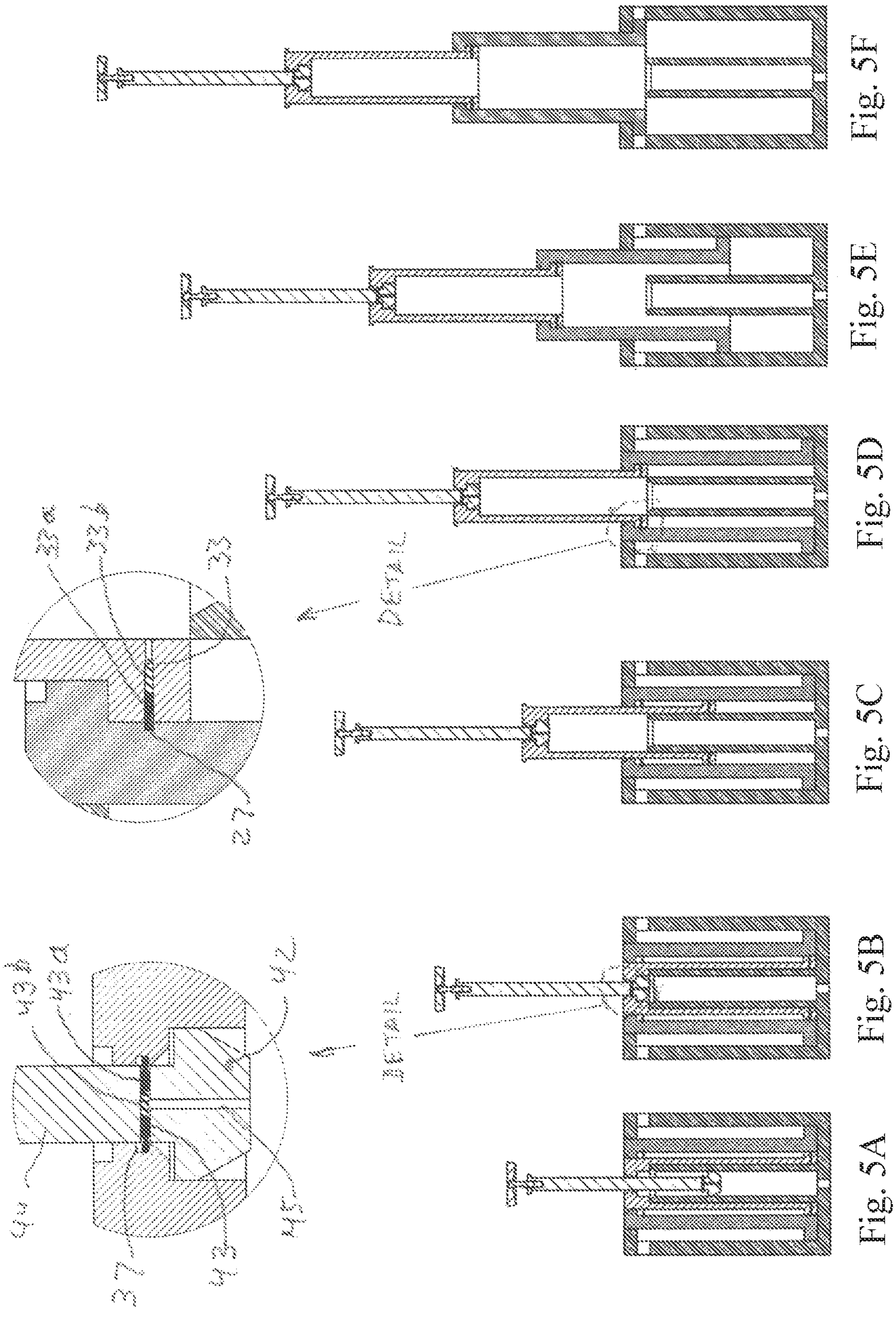
FIGS. 5A-5F are vertical cross-sectional views of the actuator of FIG. 3, in respective successive states of operation.

Driving operation, using an actuator of the second configuration, begins with a first-stage stroke (a typical state of which is illustrated in FIG. 5A) similarly to that of the first configuration (as described above with reference to FIGS. 1 and 2), except as follows: Toward the end of the first-stage stroke, i.e., after inner ram member 40 has moved a predefined distance, whereby its flange 42 is near top ring 38 (of ram member 30), the protruding pins 43*a* are forced inward by the bevel of top ring 38. After motion over another predefined, short distance, the flange 42 reaches its uppermost position, as illustrated in FIG. 5B, whereupon the pins 43*a* face the groove 37 in top ring 38 (of ram member 30) and are pushed by the spring 43*b* to engage the groove, as can be seen in the corresponding detail drawing in FIG. 5B. This engagement, in effect, locks ram member 30 to ram member 40 and they remain thus interlocked during the continuation of the operation, as further described below.

Additionally at the end of the first-stage stroke, also as illustrated in FIG. 5B, the top surface of flange 42 butts against the bottom surface of top ring 38 of middle ram member 30. At that point, seal 41 has cleared out of inner cylinder 16 and the gas is now free to flow through the top opening of inner cylinder 16 into the top space of middle ram member 30. The gas then applies pressure also to its top ring 38 (while continuing to press against the flange 42) and thus exerts an upward force also on ram member 30. Since the latter is now locked to inner ram member 40, as described above, that force is transferred to ram member 40 and commensurately increases the total force acting on the missile. Looking at this effect from another perspective, it may be said that the inner ram member 40 and the next surrounding ram member 30, being interlocked, in effect constitute a single assembly, on which the gas exerts pressure. Moreover, the total effective cross-sectional area on which the gas thus presses is defined by the inner diameter D2 (FIG. 3) of the wall 34 of ram member 30, within which both flanges 32 and 42 travel during the second stage, which begins at that point. This cross-sectional area is appreciably greater than that defined by the inner diameter D1 of inner cylinder 16, within which flange 42 travels during the first stage, when it alone is pressed by the gas. Thus, a greater force is exerted on the assembly and therefore also on the missile along the second-stage stroke.

Middle ram member 30 is typically not sealed against inner cylinder 16, and the width of a small gap between them is chosen so that some air is allowed to fill the increasing volume between fixed inner cylinder 16 and the wall 24 of outer ram member 20, but not enough to exert pressure also on flange 32. It is noted that in other embodiments, the gap may be wide enough to allow the pressurized air to reach also under its flange 32, exerting an upward force on it as well and thereby further increasing the effective area over which pressure is exerted on middle ram member 30, namely to that defined by the inner diameter of wall 24 of outer ram member 20.

During a second stage of operation, a second-stage stroke is effected by the forces described above, whereby ram member 30 (and with it also ram member 40, to which it is now locked) moves up, while its wall 34 slides in contact with seal 29 of ram member 20 and the seal 31 on flange 32 slides along the inner surface of wall 24 of ram member 20. A half-way state during this stroke is illustrated in FIG. 5C. The gas is prevented from leaking out by the seal 39; with the optional recess at the top of ram member 30, the seal 41 rests pressed against its rim 37, thus offering additional hindrance for the air to leak. The air is also prevented from leaking into the inner space of ram member 20 by the seal 31.

At the end of the second-stage stroke, i.e., after middle ram member 30 has moved a predefined distance, its flange 32 reaches its uppermost position, as illustrated in FIG. 5D, whereupon the pins 33*a* face the groove 27 in the top of wall 24 (of ram member 20) and are pushed by the springs 33*b* to engage the groove, as can be seen in the corresponding detail drawing in FIG. 5D. This engagement, in effect, locks outer ram member 20 to middle ram member 30 (which continues to remain locked to inner ram member 40) and they remain thus interlocked during the continuation of the operation.

Additionally at the end of the second-stage stroke, also as illustrated in FIG. 5D, the top surface of flange 32 of middle ram member 30 butts against the bottom surface of top ring 28 of outer ram member 20. As a result, as well as owing to the above described interlocking, outer ram member 20 is dragged upwards by ram member 30, which continues to be pushed by the pressurized air. From this point onwards, the air reaches also under flange 22 and presses it, whereby it exerts an upward force also directly on outer ram member 20, which force is transferred through the interlocking mechanism to middle ram member 30 and thence further to inner ram member 40, thus commensurately further increasing the total force acting on the missile. Here again it may be said that all three ram members, being interlocked, in effect constitute a single assembly, on which the gas exerts pressure during the third-stage, which begins at that point. Moreover, the total effective cross-sectional area of this assembly, on which the gas thus presses, is defined by the inner diameter D3 (FIG. 3) of the wall 14 of the fixed structure 10, within which flange 22 travels during the third-stage stroke (as described below). This cross-sectional area is appreciably greater than that effective during the second stage, thus further increasing the overall surface area on which gas pressure within the actuator acts. This causes the now interlocked assembly of all three ram members to further accelerate its upward motion. During this motion, which will be referred to as a third-stage stroke, the outer surface of wall 24 slides against the inner rim of the top ring 18 of the fixed structure 10 and the seal 21 around the flange 22 slides against the inner surface of wall 14 of the fixed structure 10. A half-way state along the third-stage stroke is illustrated in FIG. 5E.

The third-stage stroke (and with it—the full combined stroke of the ram) ends when the flange 21 is stopped by the top ring 18. Such stoppage may occur abruptly, upon the corresponding surfaces of these two parts butting against each other or, in the optional case of employing a shock-absorbing system 50, gradually, after the ram assembly has reached a certain speed, to which the constriction 52 is adjusted. In any case (and similarly to the first configuration described above), the motion of the ram stops at the end of the third stage and the missile is free to continue at the last speed of the ram. At this final situation, illustrated in FIG. 5F, as well as in FIG. 3, the ram (consisting of its three members 20, 30 and 30) is fully extended.

After termination of the operation in the example embodiment, the supply of pressurized gas to the inlet hole 11 is disrupted and the gas within the actuator is allowed to escape, allowing the outer ram member 20 to slide back down to its initial position within the outer cylinder 14. The pins 33*a* are then disengaged from the groove 27—for example by applying vacuum—allowing also the middle ram member 30 to slide back down to its initial position. Similarly, pins 43*a* are disengaged from the groove 37—for example by applying vacuum through vertical bore 45—allowing also the inner ram member 30 to slide back down to its initial position within the inner cylinder 16.

In the example embodiment described above, the interlocking of ram members is by means of pins engaging grooves. However, in other embodiments different means may be employed for locking one ram member to another, such as are known in the art—all being within the scope of the present invention.

It is noted, in summary, that the various ram members move successively, in that they move only one at a time with respect to each other (i.e. during the respective strokes), beginning with the inner ram member. However they also provide a cumulative effect, in that the motion of the inner ram member is the sum of all the strokes and, moreover, the driving force is, when needed, the sum of the forces acting on the ram members. During actual usage of the actuator, there will usually be a rocket or missile resting in contact with the contact plate 48 at the top of inner ram member 40. Thus the rocket will move upwards together with inner ram member 40 through the entire operation described above. That motion, being the cumulative effect of the three successive strokes described above, will be a continuous motion, with continuous acceleration due to the force exerted by the pressurized air on the various ram members. When the motion of inner ram member 40 is stopped (at the end of the third stage stroke), the rocket will break away from the contact plate 48 and continue upwards at the last attained velocity.

Also provided according to the present invention is a system that includes a pneumatic actuator as disclosed hereabove and a reservoir that contains pressurized gas. The container is fluidly connected (by means of suitable tubing) through an activation valve to the inlet hole 11 in the base 12. The system is so configured that when the activation valve is open, gas is fed, by its own pressure, from the container into the inlet hole and thence to other parts of the actuator, as described. The actuator may be of any embodiment, in particular—the embodiment illustrated in FIGS. 3-5 and described above. The system may include a single actuator or a plurality of actuators and corresponding activation valves, sharing a single reservoir.

The acceleration of the missile due to the action of the ram along its entire stroke will now be explained with reference to FIGS. 6A-6C, which are plots of the force acting on the missile against the distance travelled. The coordinate values appearing in each plot are on arbitrary scales.

Figure 6A:
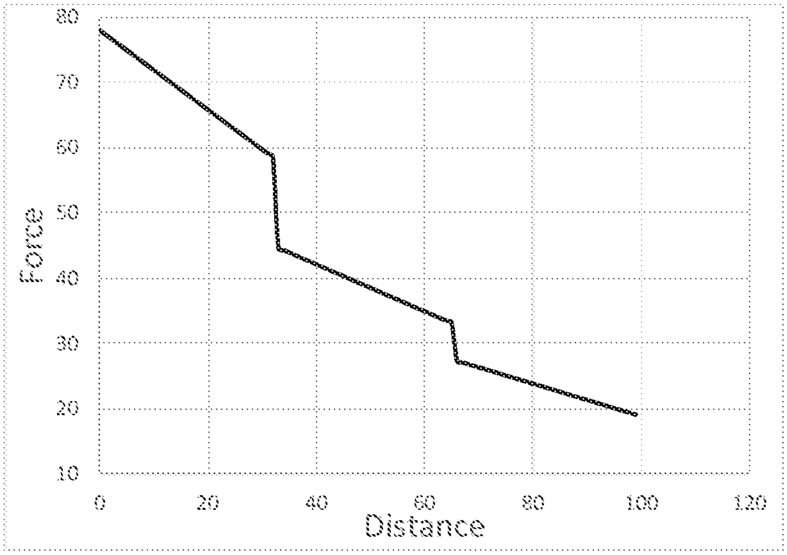
FIGS. 6A-6C are plots of force exerted on a missile by an actuator as function of distance travelled.

FIG. 6A represents the action of a typical 3-members telescopic pneumatic actuator of prior art. The initial force is very high, since the pressurized gas acts on all members simultaneously from the beginning. As the volume under the three ram members increases, the gas pressure rapidly decreases, causing the force to slope down. When the outer member reaches its upper limit, the gas begins to act on the other two members only and the total force instantaneous drops accordingly. It keeps diminishing as the volume continues to expand, until also the middle member reaches its upper limit, whereupon the force drops again. It then continues to slope down as the inner ram member rises. The energy (and thus speed) imparted to the load, which is proportional to the integral of the force over distance (i.e. area under the plot), is seen to be low, relative to the initial force and therefore relative to the initial (highest) acceleration.

Figure 6B:
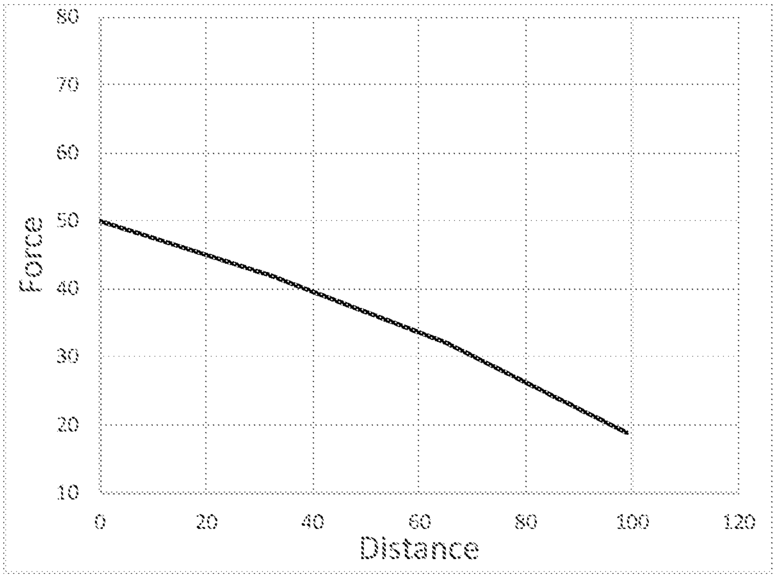

FIG. 6B represents a typical action of an actuator according to an embodiment of a first configuration of the present invention, such as described above with reference to FIGS. 1 and 2. Since the pressurized gas acts, in effect, only on the inner ram member throughout the operation, the initial force is only moderate. However it diminishes at a shallower slope than the force in the case of FIG. 6A, owing to the relatively small volume of that inner member (relative to a given volume of gas supply). Thus, in this case, the energy supplied to the load is advantageously greater, relative to the initial acceleration, than in the case of the prior-art actuator. It is noted that the plot of FIG. 6B reflects a situation in which the volume of the air reservoir is relatively small, causing the pressure to drop appreciably during the second- and third stages; this situation was chosen for comparison with the action represented by FIG. 6C. Clearly, to the extent that the air volume is large, the drop of pressure, and consequently the reduction in the force, during operation of the actuator would be less pronounced (i.e. the downward slope of the plot in FIG. 6B would be less steep).

Figure 6C:
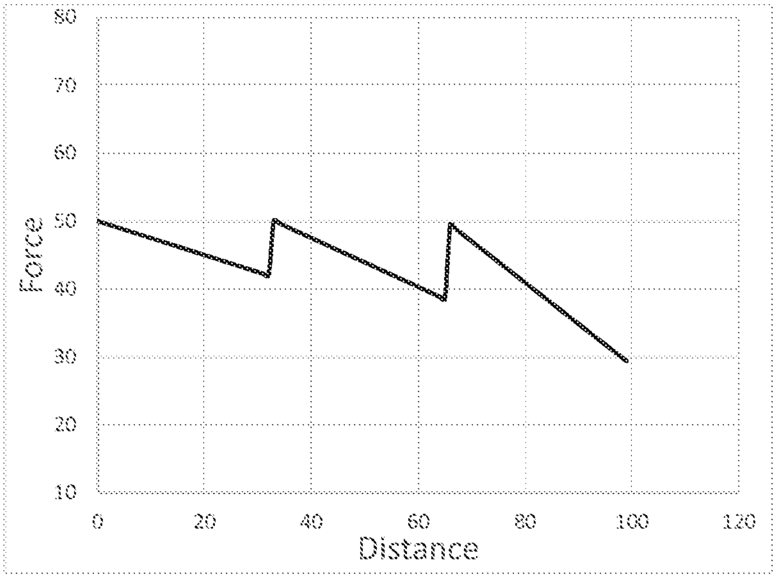

FIG. 6C represents a typical action of an actuator according to an embodiment of a second configuration of the present invention, such as described above with reference to FIGS. 3 to 5. The volume of gas supply is assumed to be the same as in the case of FIG. 6B. It will be observed that during the first-stage stroke, the gas acts (at full pressure) on flange 42 (of the inner ram member) only, with its relatively small diameter D1 (FIG. 3). During that stroke, as the flange 42 moves up, the gas expands into the inner space of inner cylinder 16 and thus its pressure diminishes, causing a commensurate reduction in the force (from 50 to about 42 in the plot—similarly to the case of FIG. 6B). At the end of the first-stage stroke, gas begins to act also on the top 38 of the middle ram member 30 and thus on a total area with diameter D2 (FIG. 3). As a result, the force increases (back to about 50 in the plot). During the second-stage stroke, as the flange 32 moves up, the gas expands into the space within the wall 24 and thus its pressure diminishes again. A similar process happens again at the end of the second-stage stroke and during the third-stage stroke, where the gas acts on the full width of the outer ram member 20, defined by the inner diameter D3 of the wall 14 (FIG. 3).

It is noted that generally in embodiments of the second configuration the total cross-sectional area to which the gas pressure is applied at any one stage of operation is inversely related to approximately the average pressure expected during that stage, thus providing stepwise compensation for the reduction of air pressure due to the limited stored volume of air. This results in the average force driving the missile being more equal between the stages. Moreover, the values of the three aforementioned diameters may be chosen to optimally minimize and equalize the differences between minima and maxima of force, as is the case in the embodiment whose performance is illustrated in FIG. 6C. It will be appreciated that, despite the reduction in air pressure, the force thus remains relatively constant over the entire stroke and thus, advantageously, the kinetic energy imparted to the load is high, for a given maximal acceleration; in some embodiments it may be practically near the maximum theoretically possible with a given overall stroke length and under the constraints of allowed maximal acceleration.

It is noted that in the example embodiments described above there are three ram members and corresponding three stages or strokes. However, in other embodiments according to the invention, the number of ram members and of corresponding stages or strokes may also be two or they may be more than three. The required consequential variations from the structure described above should be obvious to persons knowledgeable in the art; in general they would consist mainly of eliminating or duplicating, respectively, the outer ram member 20 and adjusting dimensions and details of fitting the ram members to each other accordingly.

Finally it is noted that the actuator has been depicted and described herein with its center axis being vertical. However in usage, the actuator, in any embodiment, may (and in many case must) be positioned so that its center axis forms some angle with the vertical. Therefore, in the entire description above, terms relating to vertical direction, such as "up", "upwards", "top", "bottom" and "above", should be interpreted as meaning "in a direction parallel to the center axis" or, as appropriate, "away from the base plate" or "toward the base plate".

It will be appreciated that the above descriptions are intended only to serve as examples and that many other embodiments are possible within the scope of the present invention as defined in the appended claims.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The invention claimed is:

1. A pneumatic actuator for imparting velocity to a resting object, comprising a fixed member and a ram, the ram having two or more generally elongated ram members, each having a first end and a second end, wherein the fixed member is formed with a base plate, and with an inner cylinder and an outer cylinder, fixedly joined to the base plate concentrically about a center axis, the base plate having an inlet hole therethrough, said inlet hole being in fluid communication solely with space inside said inner cylinder, wherein the ram members are disposed concentrically about said center axis so as to lie one within another and within the outer cylinder, the first end of each ram member being disposed closer to the base plate than its second end, and to move parallel to the center axis in a telescopic arrangement, characterized in that the innermost one of said ram members is accommodated within said inner cylinder so that pressurized gas fed into inlet hole acts initially only on said innermost ram member so as to displace innermost ram member independently of the other ram members, said innermost ram member being configured so that its second end drives the object, and wherein each of the other ram members is deployed externally to said inner cylinder so as to be acted on by the pressurized gas only after displacement of the innermost one of said ram members along said inner cylinder, so as to begin to move only after said innermost ram member is extended;

the actuator being operative, upon the feeding of pressurized gas into the inlet hole, to move said innermost ram member along its entire range of motion and thereby impart velocity to the object.

2. The actuator of claim 1, configured so that none of said other ram members exerts a force, directly or indirectly, on said innermost ram member in a direction away from the base plate during operation.

3. The actuator of claim 2, being further operative to have any of the ram members pull another ram member that is disposed next outside it.

4. The actuator of claim 2, further comprising a shock absorbing system, in fluid communication with a space between said outer cylinder of the fixed member and the outermost one of said ram members, the shock absorbing system being operative to prevent said outermost ram member from moving faster than the ram member next within it.

5. The actuator of claim 1, wherein at least two of the ram members include complementary engagement features for locking one of them to the other.

6. The actuator of claim 1, further comprising complementary engagement features for interlocking any one of the ram members with a second ram member next outside it.

7. The actuator of claim 6, wherein said complementary engagement features are operative to interlock said one ram member with said second ram member upon said one ram member having moved a predefined distance relative to said second ram member.

8. The actuator of claim 7, wherein said complementary engagement features include a pin near the first end of said one ram member and a groove near the second end of said second ram member, the groove formed to accommodate said pin.

9. The actuator of claim 6, configured so as to enable each of said other ram members to be driven by the pressurized gas while that ram member is interlocked with a ram member next within it.

10. The actuator of claim 9, wherein the effective cross-sectional area of all the ram members that are interlocked and over which the gas exerts a pressure to effect said driving, at any time during operation, provides stepwise compensation inversely related to the average gas pressure expected at that time.

11. A system for imparting velocity to a resting object, comprising one or more actuators as in claim 1, a reservoir, containing pressurized gas, and an activation valve corresponding to each of the actuators, wherein said reservoir is in fluid communication, through said activation valves, with the inlet holes in the corresponding actuators, the system being operative to allow the pressurized gas to be fed into any of said inlet holes when the corresponding activation valve is open.

12. The system of claim 11, wherein any of said actuators further comprises complementary engagement features for interlocking any one of the ram members with a second ram member next outside it.

13. The system of claim 12, wherein said any of said actuators is configured so as to enable each of said other ram members to be driven by the pressurized gas while that ram member is interlocked with a ram member next within it.

14. The system of claim 13, wherein, for any of said actuators, the effective cross-sectional area of all the ram members that are interlocked and over which the gas exerts a pressure to effect said driving, at any time during operation, provides stepwise compensation inversely related to the average gas pressure expected at that time.

* * * * *